Dec. 20, 1927.
E. B. THURSTON
1,653,443
CONTROLLER FOR ELECTRIC ELEVATORS
Filed Nov. 19, 1926
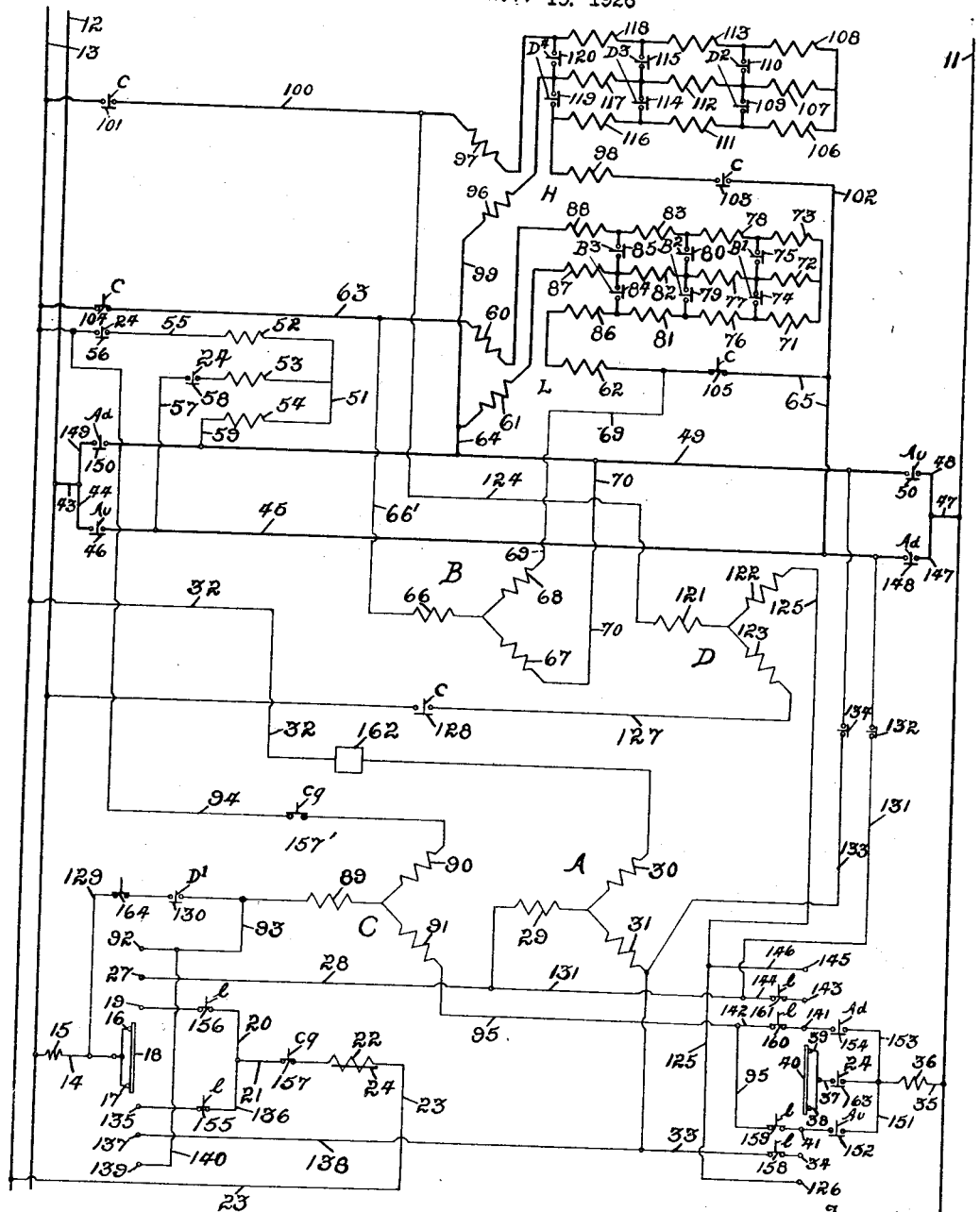
Inventor
*Ernest B. Thurston.*
By *Owen + Owen*
*Attorneys.*

Patented Dec. 20, 1927.

1,653,443

UNITED STATES PATENT OFFICE.

ERNEST B. THURSTON, OF TOLEDO, OHIO, ASSIGNOR TO THE HAUGHTON ELEVATOR & MACHINE COMPANY, OF TOLEDO, OHIO, A CORPORATION OF OHIO.

CONTROLLER FOR ELECTRIC ELEVATORS.

Application filed November 19, 1926. Serial No. 149,427.

This invention relates to installations for elevators operated by polyphase alternating current motors.

More particularly, the invention relates to the method of de-energizing the high speed motor, or the high speed winding of a multi-speed motor.

In order that the invention may be clearly understood, it is described in connection with fairly complete details of one installation in which it may be used satisfactorily.

The accompanying drawing forming a part of this specification is an across the line diagram of an installation in which the invention is incorporated.

In the installation shown, there are three power lines 11, 12 and 13, from which the three-phase low speed windings L and the similar high speed windings H are energized, these being the windings which drive an elevator at low and high speeds, respectively.

The connections will be described substantially in the order in which the circuits are energized when the elevator is started.

A line 14 is connected to the power line 12 and leads through a safety resistance 15 to terminals 16 and 17. A car switch 18 is adapted to connect terminals 16 and 17 with other terminals, as will be described.

When switch 18 is moved in one direction, it connects terminal 16 with a terminal 19 connected by a line 20 to a line 21 leading through a magnetic coil 22 to a line 23 connected with power line 13. Magnetic coil 22 actuates any suitable means 24 for closing a number of switches, which will be described later. However, no other operation of the apparatus takes place because of this preliminary connection.

Further movement of switch 18 in the same direction results in connecting terminal 16 with a terminal 27, from which a line 28 leads to one phase 29 of a direction switch operating motor A. This connects phase 29 to power line 12. The other phases, 30 and 31, of motor A are connected respectively to power lines 13 and 11. Phase 30 is constantly connected to line 13 by a line 32, while phase 31 is connected by means of a line 33 to a terminal 34.

A line 35 leads from line 11 through safety resistance 36 to line 37 branching to terminals 38 and 39. A car switch 40 is connected to move in unison with switch 18. When switch 18 is moved to connect terminals 16 and 19, switch 40 moves to connect terminal 38 and a terminal 41, whose connections will be described later. Upon the additional movement of switch 18 to connect terminals 16 and 27, switch 40 moves to connect terminals 38 and 34. In this way all three phases of motor A are connected to the respective power lines and the motor is energized.

A power line 43 is connected to power line 12 and has a branch 44 connected to a line 45 through a normally open switch 46.

A power line 47 is connected to power line 11 and has a branch 48 connected to power line 49 through a normally open switch 50. Suitable means $A^u$ closes switches 46 and 50 when motor A is actuated for up direction elevator operation.

A normally set brake 51 may be released by energizing a polyphase magnet having phases 52, 53 and 54. Phase 52 is connected by a line 55 to power line 13 through a normally open switch 56. Switch 56 is closed by means 24 when coil 22 is energized.

Phase 53 is connected by a line 57 to line 45 through a normally open switch 58. Switch 58 is closed by means 24 when coil 22 is energized. Phase 54 is connected by a line 59 to line 49.

It will be seen from the above that, when motor A is energized to close up-direction switches 46 and 50, all three phases of the brake magnet are connected with their respective power lines and the brake is released.

The low speed winding L comprises phases 60, 61 and 62. Phase 60 is connected by a line 63 to line 13. Phase 61 is connected by a line 64 to line 49. Phase 62 is connected by a line 65 to line 45. From this it will be seen that, when up-direction switches 46 and 50 are closed, all three phases of winding L are connected to their respective power lines and the motor is operated to raise the elevator.

A motor B having phases 66, 67 and 68 is provided for cutting out the acceleration means of winding L. Phase 66 is connected by line 66′ with line 63. Phase 67 is connected by a line 70 with line 49. Phase 68 is connected by line 69 to line 65. Therefore, motor B is energized when up-direction switches 46 and 50 are closed for low speed operation.

The acceleration means of motor L is shown as consisting of resistance coils 71, 72 and 73 which may be cut out by closing switches 74 and 75; resistance coils 76, 77 and 78, which may be cut out by closing switches 79 and 80; and resistance coils 81, 82 and 83 which may be cut out by closing switches 84 and 85. Preferably, there are also resistance coils 86, 87 and 88 which are permanently inserted in their respective phases. When motor B is actuated, it first closes switches 74 and 75 by means B¹, and then switches 79 and 80 by means B², and finally switches 84 and 85 by means B³.

A motor C having phases 89, 90 and 91 is provided for the high-speed switch. When switch 18 is moved beyond contact 27, it connects contact 92 with contact 16. Contact 92 is connected by a line 93 with phase 89 of motor C. Phase 90 of motor C is connected by a line 94 with line 55 which leads from power line 13 to phase 52 of the brake magnet. Phase 91 of motor C is connected by a line 95 with contact 41. It will be seen that phases 90 and 91 are already connected to power lines 13 and 11 respectively before phase 89 is connected to line 12 through contacts 92 and 16, so that connection between contacts 16 and 92 completes the energization of motor C.

High speed winding H comprises phases 96, 97 and 98. Phase 96 is connected by a line 99 with power line 64. Phase 97 is connected by a line 100 to power line 13 through a normally open switch 101. Phase 98 is connected by a line 102 to line 65 through a normally open switch 103. In line 63 there is interposed a normally closed switch 104, and a similar normally closed switch 105 is interposed in line 65 leading to phase 62 of the low speed winding. When motor C is energized, it actuates suitable means which opens switches 104 and 105 and closes switches 101 and 103, thereby de-energizing low speed winding L and energizing high speed winding H. Opening of switches 104 and 105 likewise de-energizes motor B and returns the low speed acceleration device to starting position.

High speed winding H has the usual acceleration resistance, shown herein as coils 106, 107 and 108, which may be cut out by closing switches 109 and 110; coils 111, 112, 113 which may be cut out by closing switches 114 and 115; and coils 116, 117 and 118, which may be cut out by closing switches 119 and 120.

A motor D having phases 121, 122 and 123 is provided for cutting out the high speed acceleration resistance. Phase 121 is constantly connected through a line 124 with line 100, and so is connected to power line 13 when the high speed winding is energized. Phase 122 is connected through a line 125 to a terminal 126. When switch 18 is moved to make contact with terminal 92, switch 40 is moved to connect terminal 126 with terminal 38, thereby connecting phase 122 with power line 11. Phase 123 is connected to power line 12 by a line 127 through a normally open switch 128. Switch 128 is closed by suitable means when motor C is energized.

A by-pass line 129 leads from line 93 to line 14 between resistance element 15 and terminal 16. Line 129 has interposed therein a normally open switch 130. As will be seen from the above, motor D is energized when power is applied to the high speed winding. Motor D may be so arranged that it first closes switch 130 by suitable means D', and thereafter closes switches 109 and 110 by suitable means D², then switches 114 and 115 by suitable means D³, and finally switches 119 and 120 by means D⁴, thus cutting out the resistance and fully energizing the high speed winding.

Phase 29 of direction switch motor A is connected by a line 131 to line 45. A speed governed switch 132 is interposed in line 131. Phase 31 is connected by line 133 to line 49. A speed controlled switch 134 is interposed in line 133. By this means motor A continues to be energized and holds closed direction switches 46 and 50 until the speed has dropped to a certain predetermined point, at which switches 132 and 134 open.

The operation of the installation in starting the elevator will be understood from the above description.

When it is desired to slow down or stop the elevator, switch 18 is moved away from contact 92, and simultaneously switch 40 moves away from contact 126. Breaking the connection between line 93 and line 12 does not have any immediate effect, as power continues to flow through line 129 until switch 130 is opened. Breaking the connection between line 125 and line 11 de-energizes motor D. The result of de-energizing motor D is to introduce resistance into the high speed winding by opening in succession first switches 119 and 120, then 114 and 115, and finally 109 and 110. Thereafter, switch 130 is opened, and motor C is de-energized, thereby cutting out the high speed winding and energizing the low speed winding. By actuating the switches in this order a gradual deceleration is effected. A less gradual deceleration may be effected by arranging the motor D so as to open switch 130 before the last resistance is inserted.

If switch 18 is left in position to connect contact 27 with the power line 12, the elevator continues to move at low speed. If the switch is moved away from contact 27, direction motor A is de-energized as soon as the speed is sufficiently reduced to open switches 132 and 134. If switches 18 and 40 are moved at once back to neutral, the starting coil 22 is de-energized, thereby opening switches 56 and 58 and setting the brake. It will be seen that brake 51 may be set at any time the operator desires, irrespective of whether or not the elevator has slowed down enough to open switches 132 and 134.

It will be seen that resistance elements 86, 87 and 88 are constantly interposed in the low speed winding, and they are constructed to properly control the maximum dynamic braking action of the low speed winding when winding C is de-energized.

When it is desired to operate the elevator in the opposite or down direction, switch 18 is moved to connect a contact 135 with contact 17. Contact 135 is connected to line 21 by means of a line 136. It will be seen that coil 22 is energized from contact 135 in the same way as it is from contact 19.

Further movement of switch 18 in the same direction connects a contact 137 with power line 12. Line 138 connects contact 137 with line 33 to phase 31 of motor A.

Further movement of switch 18 in the same direction connects a contact 139 with power line 12. Contact 139 is connected by a line 140 to line 93 running to phase 89 of motor C.

At the same time that switch 18 is moved to engage contact 135, switch 40 is moved to engage a contact 141, connected by a line 142 to line 95 running to phase 91 of motor C. Similarly, when switch 18 is moved to engage contact 137, switch 40 is moved to engage a contact 143 connected by a line 144 to line 31, running to phase 29 of motor A, and when the switch 118 is moved to engage contact 139, switch 40 moves to engage a contact 145 connected by a line 146 to line 125 running to phase 122 of motor D.

From the above description it will be readily seen that movement of switches 18 and 40 in the last described direction energizes the various circuits in substantially the way previously described, except that it connects coil 29 of motor A with power line 11 through line 144 and contact 143, instead of connecting it to power line 12 through line 28 and contact 27; and it connects coil 31 of motor A to power line 12 through line 138 and contact 137, instead of connecting it to power line 11 through contact 34. The result is that motor A is actuated in the opposite direction.

Line 45 is connected to line 47 by a line 147 through a normally open switch 148, and line 49 is connected to line 43 by a line 149 through a normally open switch 150.

When direction switch motor A is actuated in the manner last described, switches 148 and 150 are closed by suitable means A$^d$, thereby energizing line 45 and its connected lines from power line 11 and line 49 and its connected lines from power line 12. This reverses the connections to both the low speed and high speed windings, and, therefore, changes the direction of movement of the elevator. Otherwise the successive operation of the various parts is the same as previously described.

With the construction thus far described, movement of switch 40 to a neutral position disconnects line 95 from power line 11 and thereby de-energizes high speed switch C, cutting out the high speed winding at once, instead of first cutting in the acceleration resistances.

It is sometimes desirable to prevent the movement of the switch to neutral from cutting out the high speed windings without first inserting resistance, and for that purpose a line 151 may be provided, connecting contact 41 to line 37 between contact 38 and resistance coil 36. A normally open switch 152 is interposed in line 151, and is connected to be closed by suitable means A$^u$ when motor A is actuated for up direction operation. A similar line 153 connects contact 141 with line 37 between contact 39 and coil 36. A normally open switch 154 is interposed in line 153. Switch 154 is connected to be closed by direction switch motor A when actuated in the down direction. It will be seen that with the above described connections motor C will continue to be energized, even with switches 18 and 40 in the neutral position, until switch 130 is opened after the resistance has been inserted in the high speed winding.

The above described provisions for reinserting the resistance in the high speed before motor C is de-energized to shift the current to the low speed winding, is the main object of the present invention. It will be readily understood that this reinsertion of the resistance in the high speed winding cuts off the power from that winding gradually and thereby prevents a sudden de-energizing of the motor, which is apt to result in a noticeable jerk of the elevator.

This is particularly desirable in high speed elevators where the elevator is stopped before full speed has been attained. For example, if the elevator is moving upward and maximum power is being applied to pick up speed, an abrupt cutting out of the high speed motor results in a much more noticeable bump than where full speed has been attained before power is cut off, because less power is being applied after the elevator has attained full speed than when the speed of the elevator is being increased. Therefore, the above described arrangement is particularly useful where a high speed elevator is to be moved only one or two floors at a time.

When the elevator has acquired full speed the reinsertion of acceleration resistance before the high speed winding is de-energized is unnecessary, and may be undesirable, especially where the high speed winding is acting as a dynamic brake. Where conditions are such as to warrant the added equipment, a speed-controlled switch 164 may be interposed in line 129 and arranged to open when the elevator attains substantially full speed. With that arrangement, motor C is de-energized immediately when the car switch is moved from its high-speed position, thereby changing the power connections from the high-speed to the low-speed winding without waiting for the operation of motor D and its connected switches.

Should opening the circuit to motor D fail to open switch 130, it would be natural for the operator to move the car switch to reverse position, which would result in stopping the elevator in the manner described below.

Supposing that the motor is moving at high speed in the up direction, and that the car switches are moved to down-direction position. When switch 18 connects with contact 135 no different effect is produced from its connection with contact 19. It merely releases the brake, which is set when the car switch remains in neutral position. If the car switch is moved rapidly through neutral position to reverse position, the brake does not have time to set while the switch passes neutral position. When movement is continued until contact 137 is connected with line 14, coil 31 of direction switch motor A becomes connected through line 138 and contact 137 with power line 12; but it remains connected through line 133 and line 49 with power line 11. This would form a detrimental short circuit if it were not for resistance 15. The result of resistance 15 is to so reduce the voltage in line 138 that coil 31 continues to be energized from line 11 through line 133 as long as switch 134 remains closed.

When switch 40 connects contact 143 with power line 11, winding 29 of direction switch motor A is connected to power line 11 through line 144. However, winding 29 is also connected through line 131 and line 45 to power line 12 and, because of the interposition of resistance 36 in its connection to line 11, winding 29 continues to be energized from line 12 as long as switch 132 remains closed. Therefore, the movement of the car switches to reverse direction does not affect the direction switch motor until after the speed has been reduced enough to open switches 131 and 133.

With the elevator operating in the up-direction, winding 89 of high speed switch motor C is energized through line 129 from line 12 as long as switch 130 remains closed. When switch 18 is moved to connect contacts 137 and 139, winding 89 is directly connected to power line 11 through lines 93 and 140, contacts 139 and 137, and lines 138, 33, 133, 49, 48 and 47. Inasmuch as resistance 15 is interposed in the connection of winding 89 to line 12, and there is no resistance interposed between winding 89 and line 11, the winding is energized from line 11 instead of from line 12, with the switches in the above described position.

With switch 40 in its up-direction, winding 91 of high speed switch motor C is energized from line 11, and continues to be so energized as long as switch 152 is closed. When switch 40 is moved to connect contacts 141 and 143, winding 91 is connected to power line 12 through lines 95, 142, contacts 141 and 143, and lines 144, 131, 45, 44 and 43 as long as speed control switch 132 remains closed. As resistance 36 is interposed in the connection of winding 91 to power line 11, whereas the connection to power line 12 is without interposed resistance, winding 91 is energized from power line 12 instead of power line 11. The connections of windings 89 and 91 being thus reversed, motor C is energized to move it back to normal position, thereby opening switches 101 and 103 and closing switches 104 and 105, cutting out the high speed winding and energizing the low speed winding. The low speed winding thereafter acts as a dynamic brake until speed-controlled switches 132 and 134 are opened. When these switches open, the normal connections of the direction switch become effective and the motor is immediately actuated in the down direction if the car switch is left in its down-direction position. If the operator desires to stop the elevator, the car switch is immediately returned to neutral position after effecting the cut-out of the high speed winding.

It will be seen that the above described installation will operate to insert resistance in the high speed winding before the current is cut off from that winding, at least in the short-distance operation of the apparatus, that it will accomplish this effect even when the car switch is moved immediately to the neutral position, but that in case of emergency, arising from the sticking of any of the acceleration device of the high speed winding, the current may be switched from the high speed winding to the low speed winding by moving the car switch to the extreme reverse position.

The same results are attained with the omission of lines 151 and 153, except that this omission of lines 151 and 153 results in cutting out the high speed winding directly when the car switch is moved to neutral position. This encourages the operator to disregard the objectionable bump resulting from the sudden cutting out of the high speed winding, in order to stop more quickly.

While the installation has been described in connection with rotary polyphase motors for the switches, it will be understood that other equivalent devices may be substituted therefor.

The installation has been described in connection with two windings for different speeds, but it will be understood that the principle could be applied to an installation comprising a motor with a single winding having changed connections for different speeds, and to installations involving more than two speeds.

In the installation shown, the power switches 101, 103, 104 and 105 are controlled by actuating means separate from the actuating means of the starting devices. This is a valuable safety provision.

It will be understood that suitable interlock and other safety switches will be interposed where desired. In the installation shown, switches 155 and 156 are shown interposed in lines 136 and 20 respectively, and may be operated by any suitable limit means 1. A switch 157 is shown interposed in line 21, which may be controlled from the car gate by means cg. A similar switch 157' may be interposed in line 94. Limit switches 158, 159, 160 and 161 may be interposed in lines 35, 95, 142 and 144 respectively. Over-speed, over-travel, and floor door switches may be interposed in line 34, as indicated diagrammatically at 162. A safety switch 163, operable by magnetic coil 22, may be interposed in line 37, if desired.

If line 23 were connected to line 11 in the installation shown, instead of to line 13, movement of car switch 18 to connect contacts 35 and 37 would de-energize coil 24 as long as switches 134 and 50 were closed and thereby direct connections were established between line 11 and contact 37. A similar result would be produced when car switch 18 connected contacts 19 and 27 with switches 132 and 148 closed.

While I have described and illustrated the invention in the form which now seems to be the most practical, it is obvious that various additions and modifications may be made within the scope of the appended claims.

What I claim is:

1. In an electric elevator installation, an alternating current motor having high and low speed power connections, a high speed switch for the high speed power connection, a starting device for the circuit controlled by said switch, an actuator for said switch, a separate actuator for said device, a control switch, and connections from the control switch to the actuators operating first the actuator of the starting device and thereafter the actuator of the high speed switch for opening the power connection, when the control switch is moved from its high speed position.

2. In an electric elevator installation, multi-speed electric motor means, a high speed switch for said means, a starting device for the circuit controlled by said switch, an actuator for said switch, a separate actuator for said device, a control switch, and connections from the control switch to the actuators operating first the actuator of the starting device and thereafter the actuator of the high speed switch, when the control switch is moved to one position from its high speed position, and other connections from the control switch to said actuators operating the actuator of the high speed switch immediately when the control switch is moved to another position from its high speed position to utilize said other connections.

3. In an electric elevator installation, multi-speed electric motor means, a starting device for the high speed circuit of said means, switches controlling said means, switch operating devices constructed to reinsert said starting device in the high speed circuit before said circuit is de-energized, and a speed-controlled device operative to avoid the reinsertion of said starting device when the high speed circuit is de-energized while the elevator is travelling at approximately maximum speed.

4. In an electric elevator installation comprising low speed and high speed circuits, starting devices for each of said circuits and a car switch, connections controlled by the car switch for normally reinserting the starting device in the high speed circuit when the car switch is moved from high speed position to neutral, and connections whereby movement of the car switch from high speed to reverse de-energizes the high speed circuit without reinserting the starting device.

5. In an electric elevator installation comprising low speed and high speed circuits, starting devices for each of said circuits and a car switch, connections controlled by the car switch for normally reinserting the starting device in the high speed circuit when the car-switch is moved from the high speed position to neutral, and a speed-controlled device operative when the elevator is travelling at approximately maximum speed to de-energize the high speed circuit without reinserting the starting device when the car switch is moved away from high speed position.

6. In an electric elevator installation comprising low speed and high speed circuits, starting devices for each of said circuits and a car-switch, connections controlled by the car switch for normally reinserting the starting device in the high speed circuit when the car-switch is moved from the high speed position to neutral, and a speed-controlled device operative when the elevator is travelling at approximately maximum speed to de-energize the high speed circuit without reinserting the starting device when the car-switch is moved to neutral.

In testimony whereof I have hereunto signed my name to this specification.

ERNEST B. THURSTON.